US012374931B2

United States Patent
Naderi et al.

(10) Patent No.: US 12,374,931 B2
(45) Date of Patent: Jul. 29, 2025

(54) SELF-POWERED RECONFIGURABLE INTELLIGENT SURFACES WITH WIRELESS POWER TRANSFER

(71) Applicant: Northeastern University, Boston, MA (US)

(72) Inventors: Yousof Naderi, Brookline, MA (US); Kaushik Chowdhury, Needham, MA (US); Ufuk Muncuk, Waltham, MA (US)

(73) Assignee: Northeastern University, Boston, MA (US)

( * ) Notice: Subject to any disclaimer, the term of this patent is extended or adjusted under 35 U.S.C. 154(b) by 253 days.

(21) Appl. No.: 18/086,186

(22) Filed: Dec. 21, 2022

(65) Prior Publication Data

US 2023/0198313 A1    Jun. 22, 2023

Related U.S. Application Data

(60) Provisional application No. 63/292,714, filed on Dec. 22, 2021.

(51) Int. Cl.
*H02J 50/50* (2016.01)
*H01Q 9/04* (2006.01)
(Continued)

(52) U.S. Cl.
CPC ........... *H02J 50/50* (2016.02); *H01Q 9/0407* (2013.01); *H02J 50/005* (2020.01); *H02J 50/12* (2016.02);
(Continued)

(58) Field of Classification Search
CPC ........ H01Q 1/241; H01Q 15/002; H01Q 3/46; H01Q 9/0407; H02J 50/005; H02J 50/12;
(Continued)

(56) References Cited

U.S. PATENT DOCUMENTS 10,811,777 B1 * 10/2020 Fuchi ....................... H01Q 3/01
2019/0020110 A1 * 1/2019 Paulotto ................ H01Q 5/392
(Continued)

OTHER PUBLICATIONS

Dai et al., "Reconfigurable Intelligent Surface-Based Wireless Communications: Antenna Design, Prototyping, and Experimental Results," IEEE Access, vol. 8, 2020, pp. 45,913-923.
(Continued)

*Primary Examiner* — Thien M Le
(74) *Attorney, Agent, or Firm* — Verrill Dana, LLP

(57) ABSTRACT

Provided herein are reconfigurable intelligent surfaces (RIS) including a surface, a source tile positioned on or proximate a first side of the surface and including a source power layer including a power amplifier and a transmitter coil configured to generate an electromagnetic field and a radio frequency (RF) layer configured to receive power from the source electromagnetic field, and a patch antenna grid for reflecting a RF signal, and a plurality of extender tiles positioned on or proximate the first side of the surface, the extender tiles each including an extender power layer including a passive transceiver coil for receiving the source electromagnetic field and relaying the source electromagnetic field as an extender electromagnetic field and an extender RF layer configured to receive power from the extender electromagnetic field, and an extender patch antenna grid for reflecting at least one of the RF signal or a second RF signal.

17 Claims, 8 Drawing Sheets

(51) Int. Cl.
*H02J 50/00* (2016.01)
*H02J 50/12* (2016.01)
*H02J 50/20* (2016.01)
*H02J 50/40* (2016.01)
*H04B 7/145* (2006.01)

(52) U.S. Cl.
CPC ............ *H02J 50/20* (2016.02); *H02J 50/402* (2020.01); *H04B 7/145* (2013.01)

(58) Field of Classification Search
CPC .. H02J 50/20; H02J 50/23; H02J 50/40; H02J 50/402; H02J 50/50; H02J 50/80; H02J 50/90; H04B 7/04013; H04B 7/145
See application file for complete search history.

(56) References Cited

U.S. PATENT DOCUMENTS

| | | | | |
|---|---|---|---|---|
| 2019/0386386 | A1* | 12/2019 | Fernandez | H01Q 1/005 |
| 2022/0232422 | A1* | 7/2022 | Dai | H04W 72/21 |
| 2022/0393358 | A1* | 12/2022 | Clemente | H04B 5/26 |
| 2022/0393930 | A1* | 12/2022 | Nasiri Khormuji | H04B 7/0604 |
| 2023/0144085 | A1* | 5/2023 | Dutta | H04B 7/04013 |
| | | | | 342/350 |
| 2023/0156664 | A1* | 5/2023 | Wang | H04W 72/51 |
| | | | | 370/329 |
| 2024/0007881 | A1* | 1/2024 | Gutman | H04B 7/15 |
| 2024/0305335 | A1* | 9/2024 | Elshafie | H04B 7/0617 |

OTHER PUBLICATIONS

Montori et al., "A Transportable Reflectarray Antenna for Satellite Kuband Emergency Communications," IEEE Trans. Antennas and Propagation, vol. 63, No. 4, 2015, pp. 1393-1407.

Tan et al., "Enabling Indoor Mobile Millimeter-Wave Networks Based on Smart Reflect-Arrays," Proc. IEEE Infocom 2018, 2018, 9 pages.

Shi et al., "Wireless Power Hotspot that Charges All of Your Devices," ACM MobiCom, 2015, pp. 2-13.

Li et al., "Softcharge: Software Defined Multi-Device Wireless Charging Over Large Surfaces," IEEE J. Emerging and Selected Topics in Circuits and Systems, vol. 10, No. 1, 2020, pp. 38-51.

Tan et al., "Increasing indoor spectrum sharing capacity using smart reflect-array," in 2016 IEEE International Conference on Communications (ICC), 2016, pp. 1-8. doi: 10.1109/ICC.2016.7510962.

Tsilipakos et al., "Toward Intelligent Metasurfaces: The Progress From Globally Tunable Metasurfaces to Software-Defined Metasurfaces with an Embedded Network of Controllers," Advanced Optical Materials, vol. 8, No. 17, 2020, 18 pages.

Kamoda et al., "60-Ghz Electronically Reconfigurable Large Reflectarray Using Single-Bit Phase Shifters," IEEE Trans. Antennas and Propagation, vol. 59, No. 7, 2011, pp. 2524-2531.

Pan et al., "Intelligent Reflecting Surface Aided Mimo Broadcasting for Simultaneous Wireless Information and Power Transfer," IEEE JSAC, vol. 38, No. 8, 2020, pp. 1719-1734.

Wang et al., "Joint Precoding Optimization for Secure SWIPT in UAV-Aided Noma Networks," IEEE Trans. Commun., vol. 68, No. 8, 2020, pp. 5028-5040.

Muncuk et al., "Multiband Ambient Rf Energy Harvesting Circuit Design for Enabling Batteryless Sensors and IoT," IEEE IoT J., vol. 5, No. 4, 2018, pp. 2700-2714.

Dunna et al., "Scattermimo: Enabling Virtual MIMO with Smart Surfaces," Proc. 26th Annual Int'l. Conf. Mobile Computing and Networking, 2020, pp. 1-14.

* cited by examiner

# SELF-POWERED RECONFIGURABLE INTELLIGENT SURFACES WITH WIRELESS POWER TRANSFER

CROSS REFERENCE TO RELATED APPLICATIONS

This application claims benefit under 35 U.S.C. § 119(e) of U.S. Provisional Application No. 63/292,714, filed on 22 Dec. 2021, entitled "Self-Powered Reconfigurable Intelligent Surfaces with Wireless Power Transfer," the entirety of which is incorporated by reference herein.

STATEMENT REGARDING FEDERALLY SPONSORED RESEARCH OR DEVELOPMENT

This invention was made with government support under Grant No. CNS 1452628 awarded by the National Science Foundation. The government has certain rights in the invention.

BACKGROUND

The wireless community has witnessed significant progress over the past few years over 5G and pervasive Internet of Things (IoT) deployment. In this direction, "smart infrastructure and environments" have been identified as a leading player to bring ubiquity and pervasiveness to the next generation of the wireless system. The reconfigurable intelligent surfaces (RIS) are expected to actively shape the wireless environment and transform ordinary surfaces into intelligent environments using low-cost and low-power hardware. However, the growing applications of RIS-aided systems require advanced signal processing, intelligent computation, and higher active electronic components, such as PIN diodes, RF switch, and phase shifter. These requirements result in significant power consumption and a critical challenge to salable advancement and implementation of RIS systems. For example, an RIS operating at 28.5 GHz frequency consumes up-to 153 W with 256 elements, RIS hardware with 16×16 elements that operate over 10.7 GHz-14.5 GHz consumes 93 W, and an RIS with 224 reflective elements has around 40.32 W power consumption.

Battery-powered RIS operation cannot provide more than a day of lifetime in many practical applications while adding cost, weight, and size to deployment. Additionally, RF-based wireless power transfer and energy harvesting techniques that provide an average power charging rate of 1 W at charging distance of about 10 meters are not a suitable solution for RIS use-cases. On the other hand, coupled wireless power transfer (CWPT) is emerging as a new way for future 5G (or 6G or other cellular/mobile wireless) industrial applications in the intelligent radio environment. CWPT delivers power wirelessly to electronic devices via near electromagnetic field coupling. Traditionally, this process involves two techniques, magnetic inductive coupling (Qi), and strong magnetic resonant coupling (A4WP). However, magnetic inductive coupling is limited to short transferring distance, and requires perfect alignment between transmitter and receiver due to the inherent physical characteristics of low frequency (kHz) and loose coupling between transmitter and receiver coils. On the other hand, magnetic resonant coupling enables longer power transfer distance, higher power transfer amount, and notable spatial freedom between the receiver placement and transmitter, which shows promising performance in realizing the surface wireless charging systems. Surface wireless charging creates intelligent power distribution at different positions over a surface that enables self-powered RIS system along with contactless multi-device charging of devices close to the surface.

Previous studies reported various magnetic resonant based surface charging system with multiple resonators (coils) to improve the wireless power transfer performance. Popular methods for surface charging are Multi HotSpots and SoftCharge. Multi HotSpots use a similar theory of MIMO to wireless communication. However, the cost of multiple power amplifiers limits the wide use of this approach over large surfaces. Additionally, the synchronization complexity of multiple power amplifiers makes this difficult to implement and adapt. SoftCharge introduces the concept of software-defined wireless charging over reconfigurable, which utilizes the energy hopping phenomena and eliminates the need for multiple amplifiers and complex synchronizations. However, SoftCharge cannot create arbitrary power spots over the surface. Additionally, the complex analysis model of the cross-coupling between resonators increases the burden for configurable power distribution.

SUMMARY

Provided herein are methods and systems for self-powered reconfigurable intelligent surfaces (RIS) with wireless power transfer. These self-powered RIS architectures provide reconfigurable electric and magnetic fields over whole surfaces. When paired with a resonance coupling framework, such self-powered RIS architectures facilitate reconfiguration and redistribution of power along 1D, 2D, and 3D surfaces, thus forming targeted, reconfigurable power spots.

A coupling factor-based framework is also introduced that models power distribution over the surface based on the power change among an array of resonators, instead of relying on complex electromagnetic field interference analysis. Thus, the whole surface is reconfigurable, and the power of each resonator in the array can be separately adjustable. Accordingly, given the locations of electronic devices on the surface as well as those RIS units that need to be recharged, intelligent surface architecture configures the power distribution and amplitude of resonators and forms the desired power spots using multiple power flows.

Particular advantages of the described self-powered RIS architectures can include self-powered surface sensing, self-powered surface-based RF signal reflections, and self-powered wireless surface charging of multiple types and number of devices charging.

In one aspect a reconfigurable intelligent surface (RIS) is provided. The RIS includes a surface. The RIS also includes a source tile positioned on or proximate a first side of the surface. The source tile includes a source power layer including a power amplifier and a transmitter coil configured to generate an electromagnetic field. The source tile also includes a radio frequency (RF) layer configured to receive power from the source electromagnetic field, and a patch antenna grid for reflecting a RF signal. The RIS also includes a plurality of extender tiles positioned on or proximate the first side of the surface. The extender tiles each include an extender power layer including a passive transceiver coil for receiving the source electromagnetic field and relaying the source electromagnetic field as an extender electromagnetic field. The extender tiles each also include an extender RF layer configured to receive power from the extender electromagnetic field, and an extender patch antenna grid for reflecting at least one of the RF signal or a second RF signal.

In some embodiments, the patch antenna grid and the extender patch antenna grid each includes a plurality of patch antenna elements. In some embodiments, each patch antenna element is dimensioned at half a wavelength of a carrier frequency at each grid location. In some embodiments, each patch antenna element is spaced at half a wavelength of the carrier frequency at each grid location. In some embodiments, at least one of the RF layer and the extender RF layer further comprises a RF switch in electrical communication with each of the patch antenna grid and the extender patch antenna grid for varying an impedance of the patch antenna grid. In some embodiments, at least one of the RF layer and the extender RF layer further comprises a voltage rectifier. In some embodiments, at least one of the RF layer and the extender RF layer further comprises a DC-DC voltage converter. In some embodiments, at least one of the RF layer and the extender RF layer further comprises an integrated chip configured for controlling the battery. In some embodiments, The magnetic resonance power amplifier is a Class-D amplifier operating at 6.78 MHz. In some embodiments, the transmitter coil includes a resonance PCB coil fabricated with FR-4 epoxy glass substrate as a 2-layer PCB in which two copper coils are placed at the RF and the power layers and connected as parallel. In some embodiments, at least one of the source power layer and the extender power layer includes a capacitor bank used to adjust impedance for forming power spots over the surface. In some embodiments, at least one of the source power layer and the extender power layer includes a low-power microcontroller for controlling configuration of resonators. In some embodiments, at least one of the source power layer and the extender power layer includes a RF radio chip for sending and receiving messages between a respective source or extender tile and a power source. In some embodiments, the RF radio chip is configured, by thread-based mesh networking, to create a resilient and low-power full-mesh network among the source tile and the extender tiles. In some embodiments, the resilient and low-power full-mesh network is configured to exchange control messages among the source tile and the extender tiles for real-time adjustment of coil impedances and coordination between RIS units. In some embodiments, the RF radio chip uses 6LowPAN and IEEE 802.15.4 for communication at 2.4 GHz frequency band.

In some embodiments, the source tile is the only source tile positioned on or proximate the first side of the surface. In some embodiments, the source tile is the only electrical source in electrical communication with the extender tiles. In some embodiments, the RIS also includes at least one additional source tile positioned on or proximate the first side of the surface. In some embodiments, the patch antenna grid further configured to alter at least one of a phase, an amplitude, or a directionality of the RF signal. In some embodiments, the extender patch antenna grid further configured to alter at least one of a phase, an amplitude, or a directionality of the at least one of the RF signal or the second RF signal. In some embodiments, the RF signal and/or the second RF signal is a RF data signal. In some embodiments, the RF data signal is a mobile wireless signal. In some embodiments, at least one of the source electromagnetic field or the extender electromagnetic field is configured to transmit electrical power to one or more devices to be charged. In some embodiments, the RF layer is further configured to optionally receive power from a power source other than the source electromagnetic field.

Additional features and aspects of the technology include the following:
1. A reconfigurable intelligent surface (RIS) comprising:
   a surface;
   a source tile positioned on or proximate a first side of the surface and including:
      a source power layer including a power amplifier and a transmitter coil configured to generate an electromagnetic field, and
      a radio frequency (RF) layer configured to receive power from the source electromagnetic field, and a patch antenna grid for reflecting a RF signal; and
   a plurality of extender tiles positioned on or proximate the first side of the surface, the extender tiles each including:
      an extender power layer including a passive transceiver coil for receiving the source electromagnetic field and relaying the source electromagnetic field as an extender electromagnetic field;
      an extender RF layer configured to receive power from the extender electromagnetic field, and an extender patch antenna grid for reflecting at least one of the RF signal or a second RF signal.
2. The RIS of feature 1, wherein the patch antenna grid and the extender patch antenna grid each includes a plurality of patch antenna elements.
3. The RIS of feature 2, wherein each patch antenna element is dimensioned at half a wavelength of a carrier frequency at each grid location.
4. The RIS of any of features 2-3, wherein each patch antenna element is spaced at half a wavelength of the carrier frequency at each grid location.
5. The RIS of any of the preceding features, wherein at least one of the RF layer and the extender RF layer further comprises a RF switch in electrical communication with each of the patch antenna grid and the extender patch antenna grid for varying an impedance of the patch antenna grid.
6. The RIS of any of the preceding features, wherein at least one of the RF layer and the extender RF layer further comprises a voltage rectifier.
7. The RIS of any of the preceding features, wherein at least one of the RF layer and the extender RF layer further comprises a DC-DC voltage converter.
8. The RIS of any of the preceding features, wherein at least one of the RF layer and the extender RF layer further comprises an integrated chip configured for controlling the battery.
9. The RIS of any of the preceding features, wherein the magnetic resonance power amplifier is a Class-D amplifier operating at 6.78 MHz.
10. The RIS of any of the preceding features, wherein the transmitter coil includes a resonance PCB coil fabricated with FR-4 epoxy glass substrate as a 2-layer PCB in which two copper coils are placed at the RF and the power layers and connected as parallel.
11. The RIS of any of the preceding features, wherein at least one of the source power layer and the extender power layer includes a capacitor bank used to adjust impedance for forming power spots over the surface.
12. The RIS of any of the preceding features, wherein at least one of the source power layer and the extender power layer includes a low-power microcontroller for controlling configuration of resonators.
13. The RIS of any of the preceding features, wherein at least one of the source power layer and the extender power layer includes a RF radio chip for sending and receiving messages between a respective source or extender tile and a power source.

14. The RIS of feature 13, wherein the RF radio chip is configured, by thread-based mesh networking, to create a resilient and low-power full-mesh network among the source tile and the extender tiles.

15. The RIS of feature 14, wherein the resilient and low-power full-mesh network is configured to exchange control messages among the source tile and the extender tiles for real-time adjustment of coil impedances and coordination between RIS units.

16. The RIS of feature 15, wherein the RF radio chip uses 6LowPAN and IEEE 802.15.4 for communication at 2.4 GHz frequency band.

17. The RIS of any of the preceding features, wherein:
the source tile is the only source tile positioned on or proximate the first side of the surface; and
the source tile is the only electrical source in electrical communication with the extender tiles.

18. The RIS of any of the preceding features, further comprising at least one additional source tile positioned on or proximate the first side of the surface.

19. The RIS of any of the preceding features, wherein:
the patch antenna grid further configured to alter at least one of a phase, an amplitude, or a directionality of the RF signal; and
the extender patch antenna grid further configured to alter at least one of a phase, an amplitude, or a directionality of the at least one of the RF signal or the second RF signal.

20. The RIS of any of the preceding features, wherein the RF signal and/or the second RF signal is a RF data signal.

21. The RIS of feature 20, wherein the RF data signal is a mobile wireless signal.

22. The RIS of any of the preceding features, wherein at least one of the source electromagnetic field or the extender electromagnetic field is configured to transmit electrical power to one or more devices to be charged.

23. The RIS of any of the preceding features, wherein the RF layer is further configured to optionally receive power from a power source other than the source electromagnetic field.

BRIEF DESCRIPTION OF THE DRAWINGS

Embodiments of the present technology are described by the way of examples with references to the accompanying drawings, which are schematic and are not intended to be drawn to scale. The drawings referenced herein form a part of the specification. Features shown in the drawings are meant as illustrative of only some aspects of the invention.

DESCRIPTION

The present technology provides the first-of-its-kind self-powered reconfigurable intelligent surface architecture that can engineer the electric and magnetic fields over the surface. Additionally, it introduces a resonance coupling framework that enables configurable power spots and redistribution of power in 1D, 2D, and 3D surfaces. A coupling factor-based framework is also introduced that models power distribution over the surface based on the power change among an array of resonators, instead of complex electromagnetic field interference analysis. The whole surface is reconfigurable, and the power of each resonator can get different adjustable variations. Given the locations of electronic devices on the surface as well as those RIS units that need to be recharged, intelligent surface architecture configures the power distribution and amplitude of resonators and forms the desired power spots using multiple power flows.

Particular advantages can include self-powered surface sensing, self-powered surface-based RF signal reflections, and self-powered wireless surface charging of multiple types and number of devices charging. These capabilities are useful in various industries including, for example without limitation, creating Intelligent surfaces for future smart cities, intelligent surfaces for 6G to enhance LTE and WiFi qualities, and indoor Intelligent surfaces for interactive infrastructures.

Figure 1A:
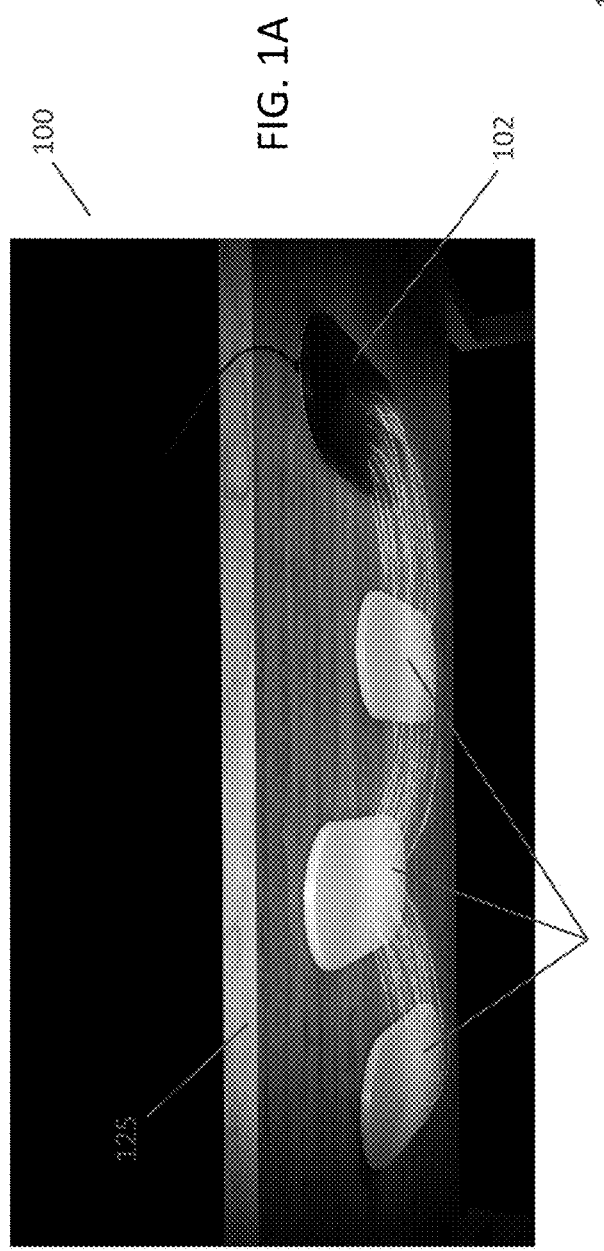
FIG. 1A illustrates a reconfigurable layout of an intelligent surface architecture wherein plug-and-play and modular tiles transform ordinary surfaces into intelligent and programmable surfaces.
Figure 1B:
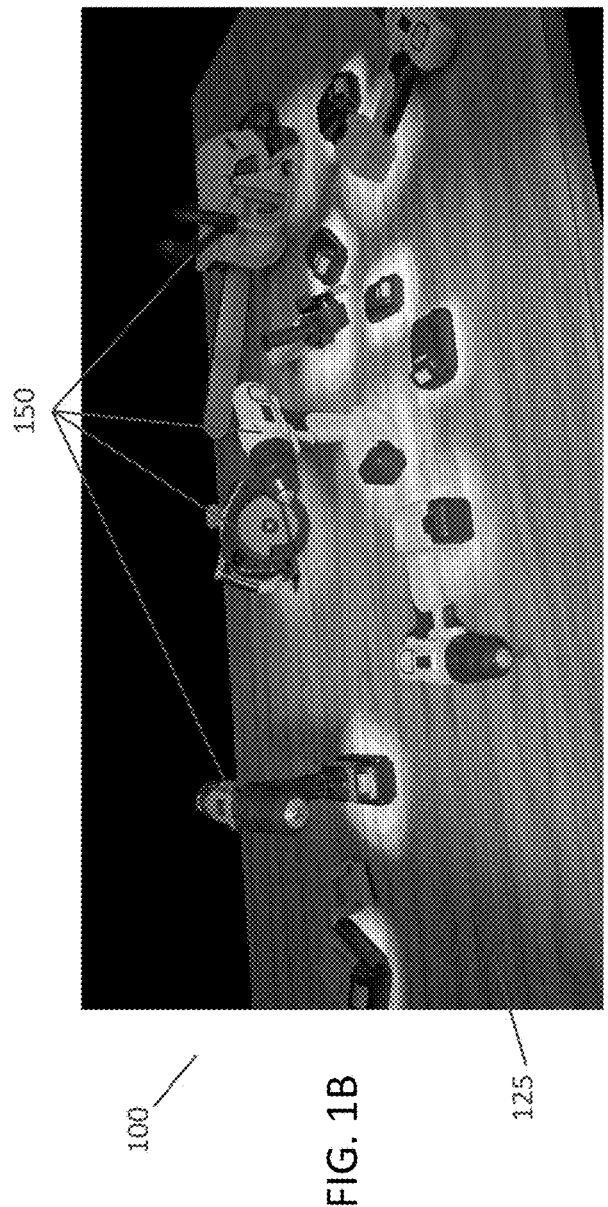
FIG. 1B illustrates a reconfigurable layout of the intelligent surface architecture providing contact-less tracking, localization, and inventory management of multiple devices over the surface.
Figure 1C:
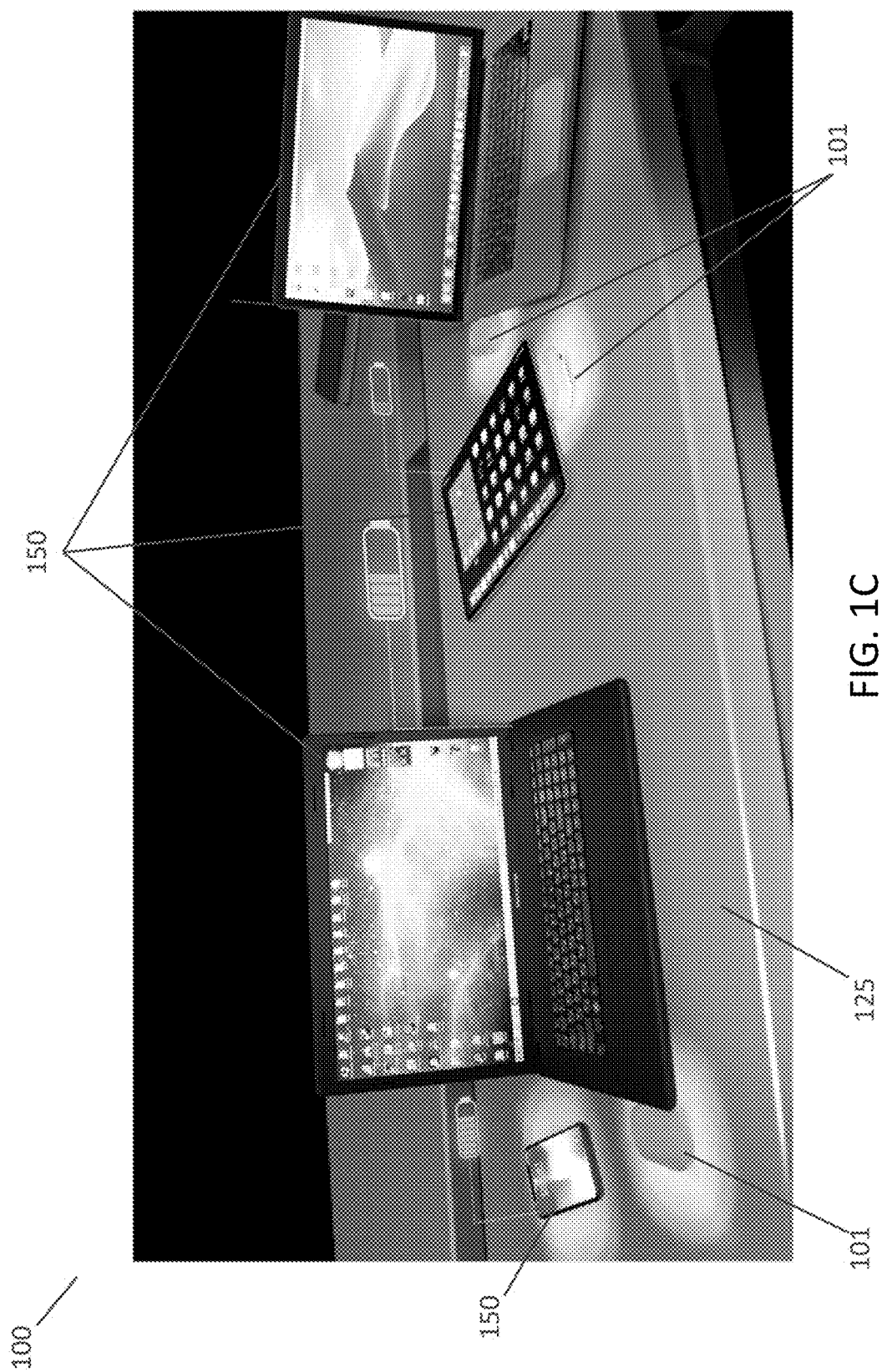
FIG. 1C illustrates a reconfigurable layout of the intelligent surface architecture providing surface-based charging of multiple types and number of devices.

Referring now to FIGS. 1A-1C, intelligent surface architecture 100 can include plug-and-play, modular, light, easy to install units, referred to hereinafter as 'tiles' 101. These tiles 101 are installed under an existing surface 125 (e.g., as shown in FIG. 1A) and transform it into a programmable and intelligent surface 100. This technology uses i) an AI-enabled sensing module that runs deep learning algorithms composed of optimized convolutional neural networks (CNNs) that serve to sense, localize, and track different devices in real-time over the surface. Sensing information from all tiles 101 is shared with the controller tile 102 that runs the deep learning model for inference and reconfigures the network of the tiles based on the sensing inputs; ii) magnetic resonance-based cognitive energy shaping algorithms that determine the right amount of power to be intelligently and safely delivered at any desired location identified by the sensing module. This allows each device to get the precisely desired level of magnetic resonance power. By transforming tables and desks to counter-tops and auto-dashboards, this surface design charging enables different types and numbers of devices 150 to wirelessly charged any whereon the surface, without the need for coil alignment; and iii) software-defined surface architecture that transforms surfaces into a programmable and pervasive fabric of connected units with multiple expandable functionalities. The tiles 101, 102 create a mesh network and share the updates with a software controller that enables real-time device 150 inventory tracking, authentication, and surface connection to the internet. There are companies striving to provide individual hardware and software for each of these services, such as in the area of device tracking using radar, camera, and RFID-based hardware, in the area of wireless charging for spot-based wireless charging, and in the area of financial technology and payment integration. However, this technology is the only solution that offers fully integrated and seamless, intelligent (AI-driven), and a reconfigurable surface 100 solution that can perform multiple and expansive functionalities with easy to deploy plug-and-play tiles 101.

Figure 2:
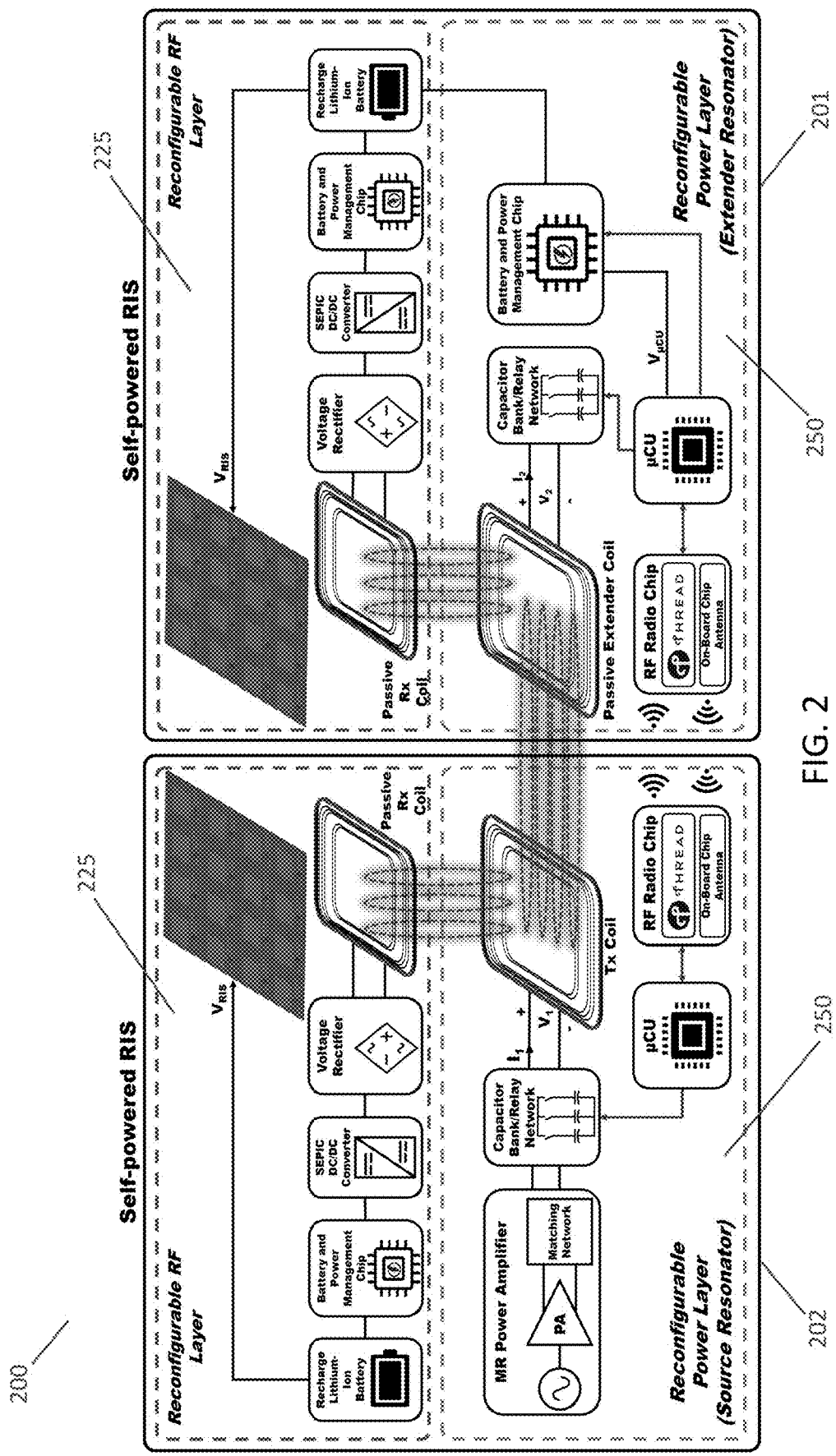
FIG. 2 illustrates a component block diagram for a self-powered RIS system with reconfigurable RF and power layers.

FIG. 2 depicts the design of the first-of-its-kind self-powered RIS architecture 200 that includes two reconfigurable layers 225, 250. The RF layer 225 engineers ambient wireless propagation in the environment and the power layer 250 recharges the RIS units 201, 202 and wirelessly charges multiple devices close to the surface.

At the RF layer 225, the receiver coils can obtain power from the power layer to charge a battery of a RIS unit 201, 202 through the rectifier, DC-DC voltage converter, and battery control part. The stored energy in the battery of the RIS unit 201, 202 provides energy for self-powering of the RF layer 225. The RF layer 225 can include a patch antenna array configured to reflect a RF signal. In some embodiments the reflected RF signal can include a RF data/information signal such as, for example, a wireless communications signal (e.g., a 5G or other cellular/mobile wireless signal, a WiFi signal, or any other data/information signal). The patch antenna array, in some embodiments, can jointly influences the reflected signals' phase, amplitude, and/or directionality. In some embodiments, patch antenna elements of dimension half wavelength of the carrier frequency are placed at each grid location with a spacing of half wavelength of the carrier frequency to minimize mutual coupling effects between neighboring antenna elements. Furthermore, each element can be connected to eight lossless transmission lines that can vary the antenna element's impedance via a if switch. RF switch and transmission lines can be placed on the top layer of RIS PCB to tune each RIS element's dynamical response in real-time based on the microcontroller commands. The RF antenna array can be designed to operate optimally at one or more sets of frequencies, including 5G operational bands.

The power layer 250 can be a surface-aided wireless charging system and includes arrays of reconfigurable resonators 201, 202. This layer 250 creates arbitrary power spots over the surface, and power propagates on the power layer 250 between resonators 201, 202 through energy hopping. Here, a portion of power that passes into each resonator 201, 202 recharges the RIS unit 201, 202, enabling self-powered RIS operation. The rest of the power transmitted by the power layer 250 charges electrical devices close to the surface and goes into neighbor resonators 201. The power layer 250 can, in some embodiments, include only one source resonator 202 and multiple reconfigurable extender resonators 201. The source resonator 202, in some embodiments, can include i) a magnetic resonance power amplifier that is a Class-D amplifier operating at 6.78 MHz, ii) a customized resonance PCB coil fabricated with FR-4 epoxy glass substrate as a 2-layer PCB in which two copper coils are placed at the RF layer 225 and the power layer 250 and connected in parallel, iii) a capacitor bank/relay network used to adjust impedance for forming the power spots over the surface, iv) a low-power microcontroller orchestrates the control of resonators configurations, and/or v) a rf radio chip used to send and receive messages between resonators and power source. The RF radio chip uses thread-based mesh networking to create a resilient and low-power full-mesh network among the resonators to exchange the control messages for real-time adjustment of coils impedances and coordination between RIS units. The experimental prototypes described herein use, for example, 6LowPAN and IEEE 802.15.4 for communication at 2.4 GHz frequency band. In the experimental prototype there are two main hardware differences between extender 201 and source 202 resonator hardware design: i) a rechargeable lithium-ion battery with a capacity of 34.6 Wh and a weight of 191 grams utilized to provide power requirement of components in the extender resonator 201, and ii) a battery and power management integrated chip in the extender resonator 201 that includes separate isolated DC/DC converters for the required voltage level to power up different components in the resonator with overcurrent protection and voltage and current sensing.

The present technology introduces a framework for reconfigurable surface aided wireless charging systems that models and captures arbitrary power distribution over the surface from a source of power over an array of resonators 201, 202. The framework facilitates optimal resonator configurations for forming configurable and desired power spots.

Figure 3:
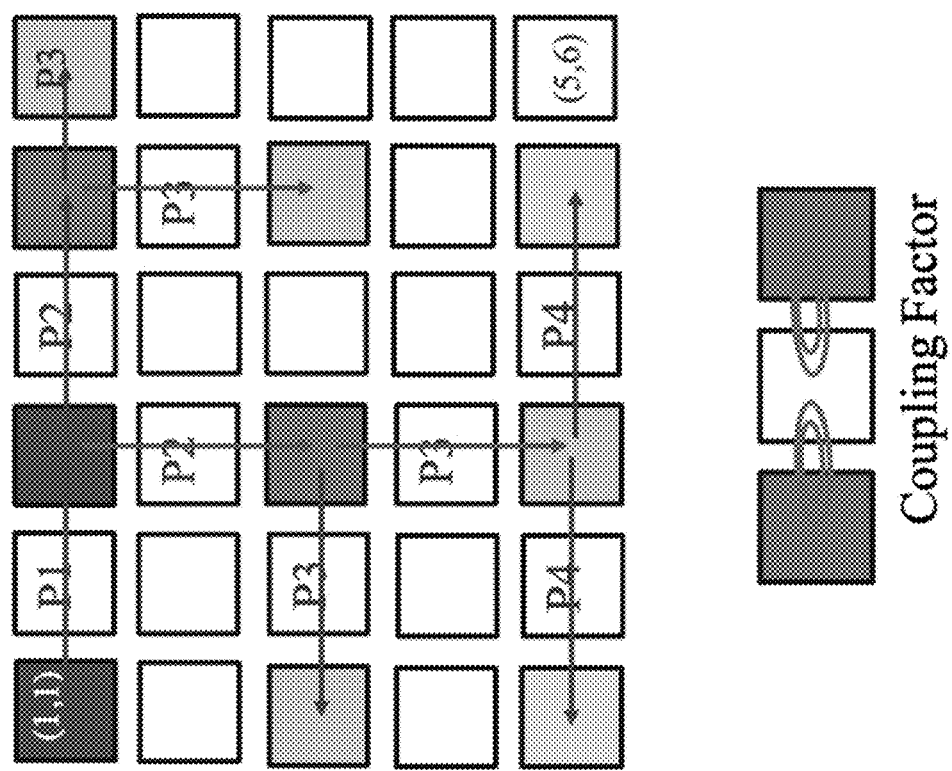
FIG. 3 is illustrates resonator arrays for 1D, 2D, and 3D surfaces.
Figure 3:
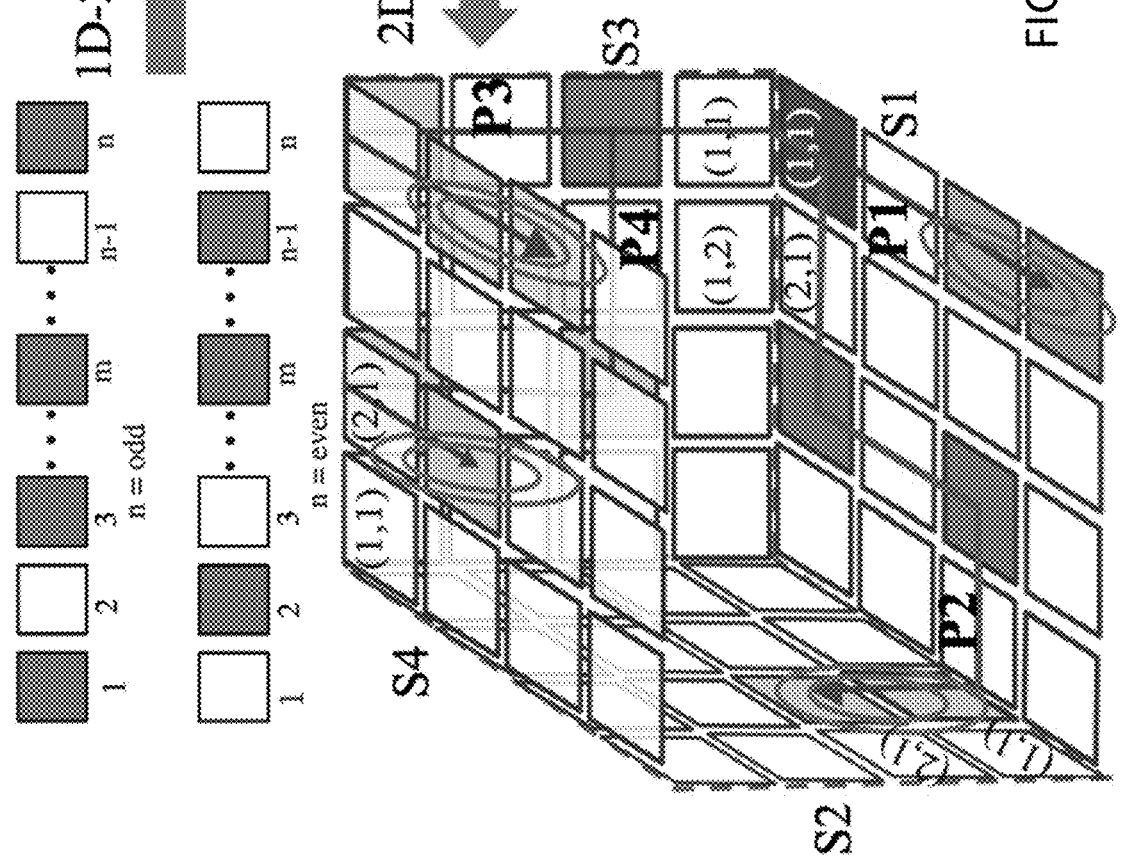

In FIG. 3, each square block represents a resonator with parameters such as self-inductance, resonant capacitance, and the mutual inductance with neighbor resonators. Here, 1D array includes n resonators, the 2D surface includes densely placed resonators in two dimensions, and the 3D surface has multiple 2D surfaces such as S1, S2, S3, and S4, where the resonators can be arranged vertically and horizontally together. Each surface has at least one source resonator that generates power and one or more extender resonators to hop the power. The power is generated from the source resonator and hop through extended resonators over the surface. The power will be redistributed between resonators when there is a strong coupling between each pair of resonators in the array. On the other hand, the disconnection of strong coupling in the array of resonators blocks the power from hopping and propagation. On a surface, each resonator is surrounded by multiple neighbor resonators. These neighbors divide power from the resonator to multiple power paths. For example, it can be observed in FIG. 2, for the case 2D surface, power path P1 can be divided to paths P2, P2 to P3, and then to P4. Similarly, for the case 3D, paths P1, P2, and P3 share the first resonator's power. The last resonator of one path becomes the first resonator of the divided path. Resonators' power exchange and the ratio of power split rely on the mutual coupling between them, and the variation of mutual coupling significantly affects each resonator's power allocation. The coupling factor is defined between any two resonators as a metric that describes the mutual coupling ratio between them and ranges from 0 to 1. Additionally, the coupling factors between a resonator and its neighbors would be determined based on the capacitance of each resonator.

The self-powered RIS is implemented with wireless power transfer and demonstrated by i) evaluating the power distribution of the proposed RIS surface, and ii) wirelessly charge the real devices such as a drone and an iPad with the RIS surface while it is also powering the RIS units. Toward this end, a prototype of intelligent surface architecture for the 1D, 2D, and 3D surface charging scenarios was built by using off-the-shelf power amplifiers, PCB transmitter coil, and the electronic components (SMD capacitors with different fixed value) to change the coupling factor. A fabricated PCB coil resonator is 15 cm×22 cm$ with the inductance of 4.8 µH. Power resistors are used as the load to measure the power at different locations through the surface. Sixteen antenna elements are used at the RF layer of each RIS unit, composed of patch antenna that comprises a metal patch on the top layer of the PCB dielectric substrate and a full metal sheet on the bottom layer. Furthermore, each element is connected to eight loss-less transmission lines. Each RIS unit consumes around 325 mW for all 16 elements, with the RF switches and the microcontroller accounting for 320 mW and 5 mW, respectively. The total power consumption of each self-powered RIS unit, including all components of the RF and power layers, is about 0.5 W. The battery and power management chip in RF layer ensures to charge rechargeable Lithium-Ion battery with up to 1 W charging rate in a reasonable time. The RIS PCB is designed in two layers and fabricate it with FR-4 epoxy glass substrate with dimension of 25 cm×25 cm×0.16 mm, where 1 m×1 m area includes 256 elements with 16 RIS units/resonators. iPads and drones are used as commercially available user electronic devices to test the charging performance of intelligent surface architecture for different charging applications. The prototype of intelligent surface architecture is implemented in the lab with a temperature of 25° without any software and hardware change of electronic components and devices. The total cost of a RIS unit with source resonator is $160, and the total cost of a RIS unit with relay resonator is $122. The magnetic resonance wireless power hopping and transfer at 6.78 MHz will not interfere with and impact the RF signals at GHz bands, and thus the RF layer operates independent from the power layer. Simulations of power distributions are performed in COMSOL Multiphysics by building the model of RIS with the same characteristics as physically fabricated self-powered RIS units.

Figure 4:
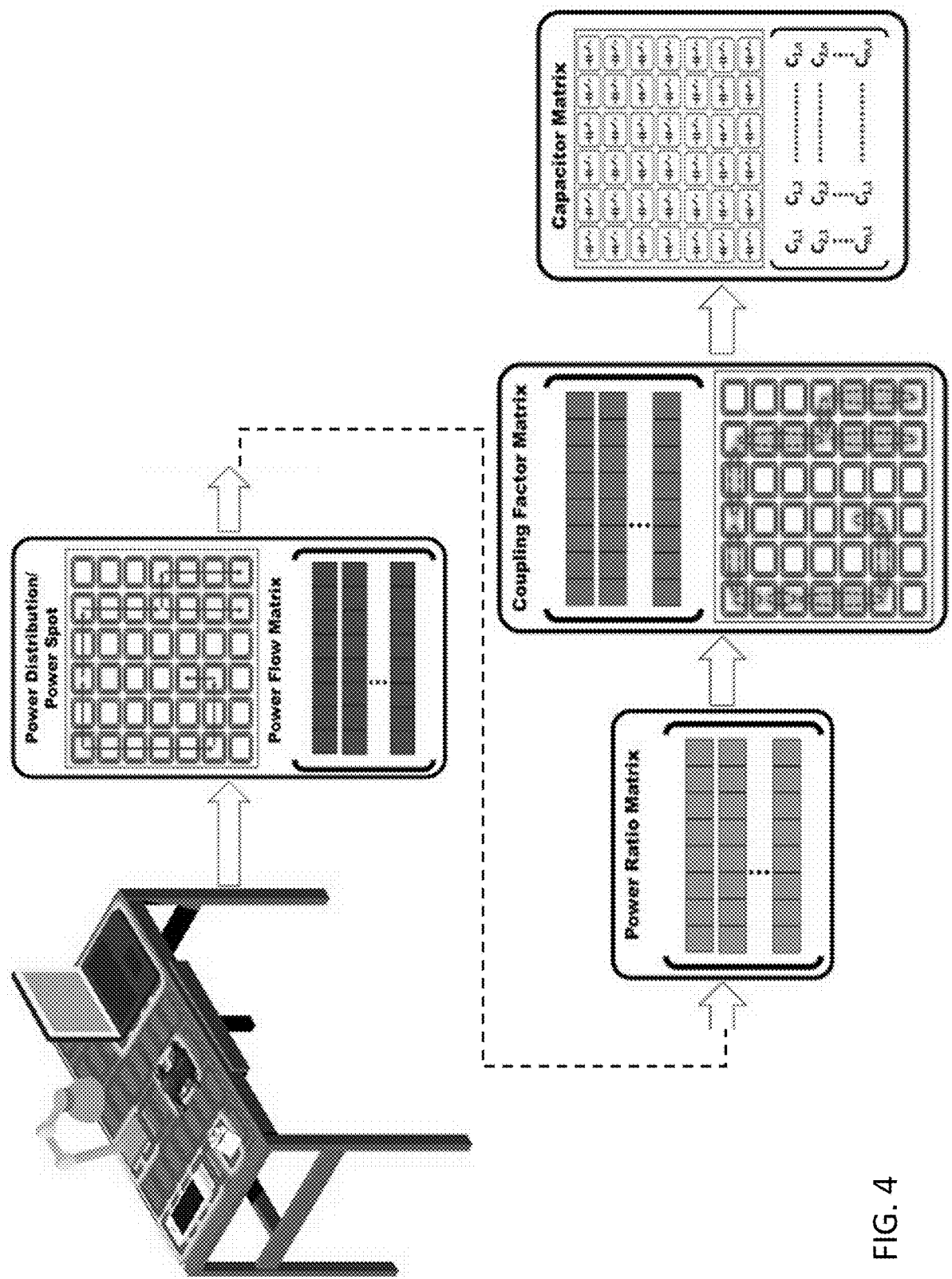
FIG. 4 illustrates a power distribution framework for an intelligent surface architecture using resonance coupling.

FIG. 4 illustrates intelligent surface architecture resonance coupling reconfigurable power distribution framework. FIG. 4 shows the resonance coupling power distribution framework that captures the process of driving the capacitance configurations for arrays of resonators to form arbitrary power spots over 2D surface. A set of electronic devices placed on the surface and equipped with a magnetic resonance power receiver can be charged simultaneously when the generated power distribution over the surface has enough power underneath each device. In other words, the magnetic resonance coupling framework needs to create power spots at the right locations and with enough amount of power. Given the maximum power of the source resonator, the desired locations of power spots, and the required level of power per spot, the power flow paths from source to target devices can be determined. Red arrows in FIG. 3 show the power flow path. Accordingly, the power flow matrix presents the power density of each resonator through power hopping. In the next step, the normalized power densities would be calculated and present as a power ratio matrix, where each element shows the normalized power density of each resonator over the surface, ranging from 0 to 1. Based on Kirchhoff's Voltage Law (KVL), the coupling factor between each pair of resonators can be calculated and presented by the coupling factor matrix. The coupling factor matrix along KVL equations give us the required capacitance for each resonator on the surface. intelligent surface architecture reconfigurable resonator design enables the capacitance change of each resonator. The source resonator uses the RF control channel to send the configuration commands via the mesh network to reconfigure each resonator directly. The resonator receives the source resonator's control message and uses the microcontroller to select a combination of capacitors from its capacitor bank to adjust the resonator's capacitance. Accordingly, the proposed resonance coupling framework creates configurable and arbitrary power spots for different locations and power levels over the surface.

Figure 5:
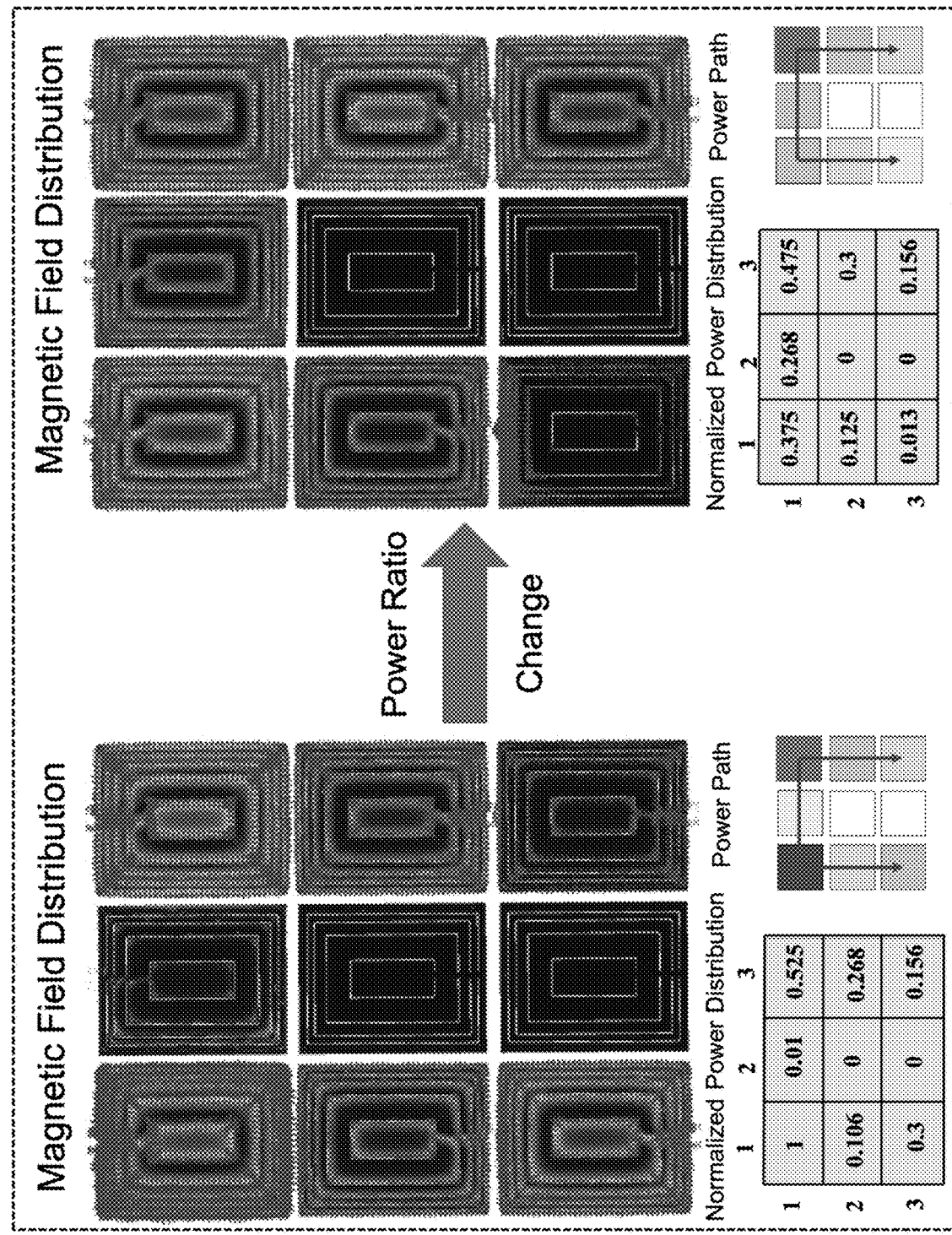
FIG. 5 illustrates a simulation of power distribution on a 2D surface for two different RIS configurations.

FIG. 5 illustrates simulation of power distribution of 2D surface for two different RIS configurations. The power distribution based on the reconfigurable resonator model is simulated using COMSOL. The model contains a 2-layer PCB with FR-4 epoxy glass substrate in which two copper coils are placed at the top of the bottom layer of PCB and connected as parallel. Each turn's width is specifically selected as 2 mm, and the thickness of copper as 0.14 mm for copper coils. This selection gives the calculated inductance of 4.64 pH, and quality factor of 330 at 6.78 MHz, which is higher enough for wireless transfer power efficiently. The overall size of each resonator is 15 cm×22 cm×1.5 mm. In the simulation, an AC source operating at 6.78 MHz with a 1 A peak value is selected. For 2D surface simulation, nine resonators are placed with an identical gap of 1.5 cm. FIG. 5 shows the magnetic resonance power distribution over the RIS-powered surface with two resonance configurations that have different coupling factors between resonators. The surface has three rows and three columns, and the resonator located at (1,1) is the source resonator and connected to the power amplifier. The red arrows around resonators depict the corresponding magnetic field. The higher the power density of a resonator, the more arrows over it. The resonators without any red arrows, such as (2,2) and (3,2) with capacitance change of 100 pF or higher, would not pass the power flow. Additionally, FIG. 5 shows the corresponding results for normalized power distribution (i.e., power ratio matrix). It can be observed that while the power paths of these two configurations are the same, their normalized power distributions are different. In the first configuration on the left, the power ratios over the first power flow are [1,0.106,0.3], and over the second power flow are [1,0.01, 0.525, 0.268, 0.156]. The capacitors over these power paths are [0 pF, 2 pF, 5 pF] and [0 pF, 2 pF, 0 pF, 0 pF, 9 pF,] respectively. In the second configuration on the right, the power ratios over the first power flow are [0.375,0.125,0.013] and for the second power flow are [0.375,0.268, 0.475, 0.3, 0.156]. Here, the capacitors over these two power flows are [0 pF, 7 pF, 2 pF] and [0 pF, 5 pF, 0 pF, 7 pF, 2 pF] respectively. The simulation results demonstrate the impact of different configurations on power distribution. Next, experimental results for the same RIS configurations are presented to compare the fabricated prototype results and the simulations.

Figure 6:
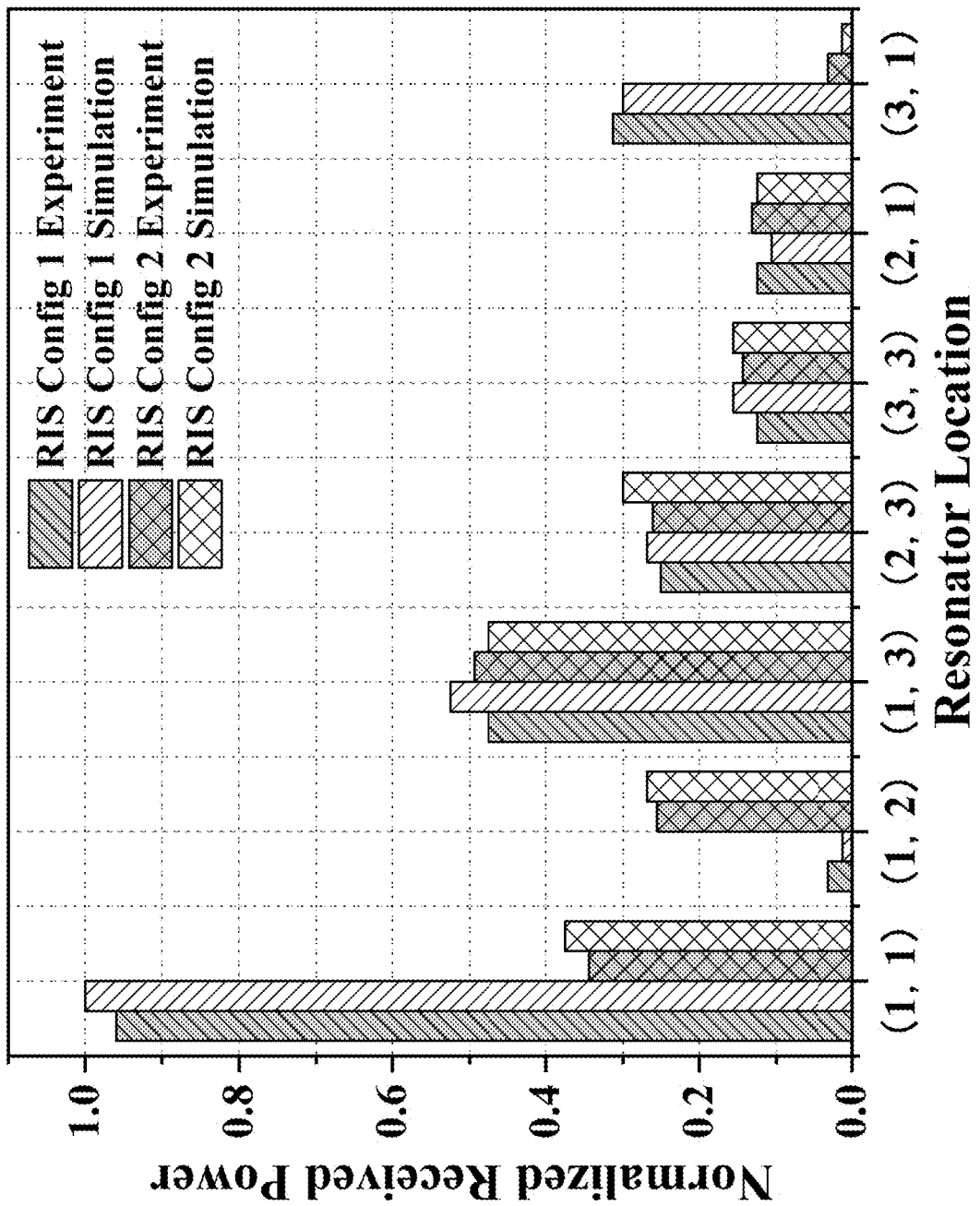
FIG. 6 illustrates experimental and simulation results of normalized received power over a 2D surface for each of two RIS configurations.

FIG. 6 illustrates experimental and simulation results of the normalized received power over the 2D surface for different RIS configurations. Performance of the proposed RIS prototype over 2D surface is studied and compared with the simulation results. For ease of comparison between the results, the received powers are normalized by the maximum received power of 16 W. This means, for example, the normalized power 1 represents 16 W. The experimental setup includes nine resonators that are fabricated as described in section III. The resonators are placed in three rows and three columns, and the gap between each resonator pair is 1.5 cm as same as the configuration in the simulation. Each resonator's location index pattern and coil orientation on the surface follow the same index and orientation shown in FIG. 5. The resonator located at (1,1) connects to the power amplifier, and resonator (3,3) is the terminal resonator. The resonators located at (2,2) and (3,2) are set with capacitor change of higher than 100 pF to block the power, while the rest of the resonators allow energy hopping. FIG. 6 shows the experimental results of net received power for two RIS configurations. The net receiver power of each location over surface is the received power over that location after powering the RIS unit. Here, around 1 W from the total power goes to the RIS unit, and the rest is the net received power that can charge the devices close to the RIS unit surface along with energy hop to the next resonator. A power resistor of 22 Ohm is used as the receiver to measure the net received power. As explained in the simulation, RIS configuration 1 and 2 both create two power paths, path 1 of (1,1)-(2,1)-(3,1) and path 2 of (1,1)-(1,2)-(1,3)-(2,3)-(3,3) and deliverable power at each resonator can be observed in FIG. 5 and ranges from 0 W to 16 W over the surface. In RIS configuration 1 for path 1, the power ratio between resonator (2,1) and (3,1) is [0.138,0.3125], with delivered power of 2 W and 4.5 W, respectively. For path 2, resonator (1,2) and resonator (1,3) can deliver 0.5 W and 7.6 W, respectively, with the power ratio of [0.03125,0.475]. The power ratio between resonators (2,3) and (3,3) is [0.25,0.125] and the received power from resonators (2,3) and (3,3) is 3.9 W and 1.9 W, respectively. In case RIS configuration 2, the deliverable power at resonator (1,1) has a large drop compared to case 1 due to the different surface capacitance configurations. The power of resonator (1,1) changes from around 16 W (15.5 W to be exact) in configuration 1 to 5 W in configuration 2. In path 2 for the RIS configuration 2, the power ratio between resonators (2,3) and (3,3) is [0.261, 0.143], with deliverable powers of 4.2 W and 2.3 W, respectively. However, path 1 in this configuration only gets 3 W, which is shared by resonators (2,1) and (3,1) with deliverable power of 2.2 W and 0.5 W, respectively. The normalized experimental results for the received power and the simulation results are compared in FIG. 6 for two studied surface configurations. The results demonstrate a good match with low errors.

Figure 7:
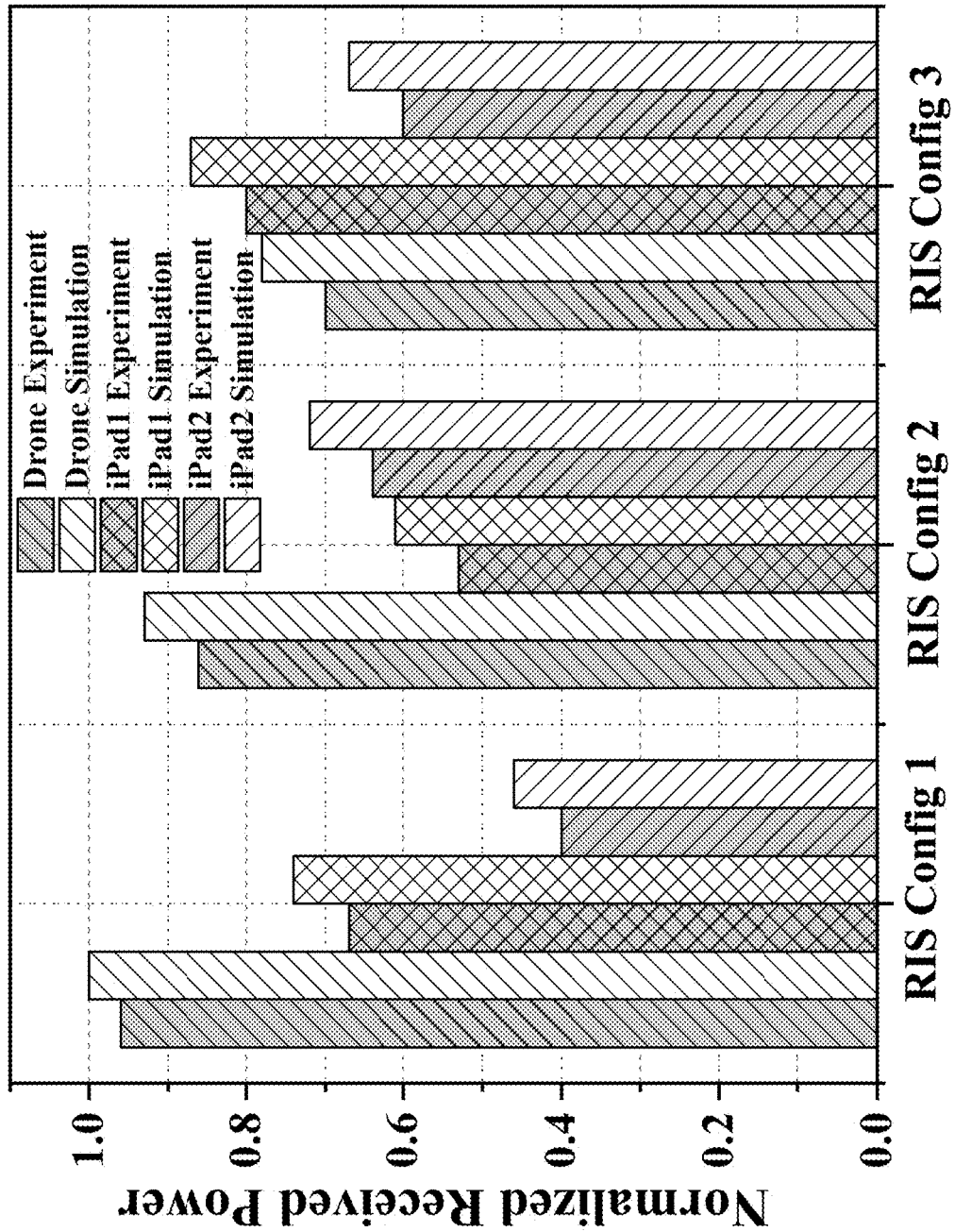
FIG. 7 illustrates experimental and simulation results of normalized received power over a 3D surface for each of two iPads and a drone across each of three different RIS configurations.

FIG. 7 illustrates experimental and simulation results of the normalized received power over the 3D surface for iPad and drone over three different RIS configurations. The experimental results are compared with the simulation results that are obtained for the same RIS configurations and locations of devices. Two iPads are used for the tablet and one SANROCK U52 drone for the drone experiments. The experimental setup includes four 2D surfaces (S1 to S4) with the vertical and horizontal arrangement similar as shown in FIG. 3. The fabricated resonators are attached to each surface from S1 to S4. S1, S2, and S4 have six resonators with a 1.5 cm gap between them, and S3 has four resonators with a 2.2 cm gap. The index of each resonator is the same as the resonator index pattern in FIG. 3. For example, S1(1,1) denotes resonator (1,1) at surface S1 and S2(1,2) denotes resonator (1,2) at S2. Here, one source resonator is located at S1(1,1). A magnetic resonance receiver is attached to iPads and drone devices to get power from the surface. In the setup, the drone battery is removed, and the magnetic resonance receiver is connected to the drone engine. When the drone starts getting power from any resonator, the engine begins running in the landing state with the standard propeller's rotating speed as when the drone is running with a battery. iPad does not have any hardware or software change except one extra magnetic receiver connected for direct charging the battery. The maximum power of the source resonator from the amplifier is 33 W. The experimental results for three different 3D surface configurations are depicted in FIG. 7, wherein each case, iPads, and drone are getting power simultaneously in real-time. In these three configurations drone, iPad1 and iPad2 are located at S1(1,3), S3(2,1) and S4(2,2), respectively, at three different surfaces, and the net received power are normalized by the maximum received power of 7.5 W. For RIS configuration 1, the drone can get around 7.5 W through power path 1 S1(1,1)-S1(1, 2)-S1(1,3), the iPad1 and iPad2 received around 5 W and 3 W through power path 2 S1(1,1)-S3(1,1)-S3(2,1)-S4(2,1)-S4(2,2). The capacitors charge over power paths 1 and 2 are [0 pF, 2 pF, 0 pF] and [0 pF, 2 pF, 0 pF, 2 pF, 5 pF], respectively. At second RIS configuration, the power ratios between drone, iPad1 and iPad2 are [0.86,0.53,0.64] with received power around 6.5 W, 4 W and 4.8 W, respectively. The capacitors change over path 1 and path 2 are [0 pF, 2 pF, 0 pF] and [0 pF, 5 pF, 2 pF, 2 pF, 4 pF]. At the third RIS configuration, the capacitors change over path 1 and path 2 are reconfigured as [0 pF, 2 pF, 4 pF] and [0 pF, 5 pF, 2 pF, 3 pF, 7 pF], respectively. The received power of drone, iPad 1 and iPad 2 become 5.2 W, 6 W and 4.5 W, respectively. The simulations are conducted with the same RIS configurations as the experiment, and the results of the normalized power are shown in FIG. 7. It can be observed that the experimental power ratios are lower than the simulation; this is because the practical power loss at the power conversion between the receiver and the battery of devices. As shown, the more devices receiving power simultaneously, the higher the end-to-end power efficiency, where this efficiency would be defined as the received power of devices divided by input power of the power amplifier. In the 2D surface experiment, the measured end-to-end efficiency for RIS configurations 1 and 2 are 63% and 67%, respectively. Additionally, the end-to-end efficiency for 3D surface experiment are 71%, 87%, 82%, for RIS configuration 1, 2, and 3, respectively.

What is claimed is:

1. A reconfigurable intelligent surface (RIS) comprising:
a surface;
a source tile positioned on or proximate a first side of the surface and including:
 a source power layer including a power amplifier and a transmitter coil configured to generate an electromagnetic field, and
 a radio frequency (RF) layer configured to receive power from the source electromagnetic field, and a patch antenna grid for reflecting a RF signal; and
a plurality of extender tiles positioned on or proximate the first side of the surface, the extender tiles each including:
 an extender power layer including a passive transceiver coil for receiving the source electromagnetic field and relaying the source electromagnetic field as an extender electromagnetic field, and
 an extender RF layer configured to receive power from the extender electromagnetic field, and an extender patch antenna grid for reflecting at least one of the RF signal or a second RF signal,
wherein at least one of the RF layer and the extender RF layer further comprises:
 a RF switch in electrical communication with each of the patch antenna grid and the extender patch antenna grid for varying an impedance of the patch antenna grid; or
 a voltage rectifier; or
 a DC-DC voltage converter; or
 an integrated chip configured for controlling the battery; or
 a combination thereof.

2. The RIS of claim 1, wherein the patch antenna grid and the extender patch antenna grid each includes a plurality of patch antenna elements.

3. The RIS of claim 2, wherein each patch antenna element is dimensioned at half a wavelength of a carrier frequency at each grid location.

4. The RIS of claim 2, wherein each patch antenna element is spaced at half a wavelength of the carrier frequency at each grid location.

5. The RIS of claim 1, wherein the magnetic resonance power amplifier is a Class-D amplifier operating at 6.78 MHz.

6. The RIS of claim 1, wherein the transmitter coil includes a resonance PCB coil fabricated with FR-4 epoxy glass substrate as a 2-layer PCB in which two copper coils are placed at the RF and the power layers and connected as parallel.

7. The RIS of claim 1, wherein:
the source tile is the only source tile positioned on or proximate the first side of the surface; and
the source tile is the only electrical source in electrical communication with the extender tiles.

8. The RIS of claim 1, further comprising at least one additional source tile positioned on or proximate the first side of the surface.

9. The RIS of claim 1, wherein at least one of the source electromagnetic field or the extender electromagnetic field is configured to transmit electrical power to one or more devices to be charged.

10. The RIS of claim 1, wherein the RF layer is further configured to optionally receive power from a power source other than the source electromagnetic field.

11. A reconfigurable intelligent surface (RIS) comprising:
a surface;
a source tile positioned on or proximate a first side of the surface and including:
a source power layer including a power amplifier and a transmitter coil configured to generate an electromagnetic field, and
a radio frequency (RF) layer configured to receive power from the source electromagnetic field, and a patch antenna grid for reflecting a RF signal; and
a plurality of extender tiles positioned on or proximate the first side of the surface, the extender tiles each including:
an extender power layer including a passive transceiver coil for receiving the source electromagnetic field and relaying the source electromagnetic field as an extender electromagnetic field, and
an extender RF layer configured to receive power from the extender electromagnetic field, and an extender patch antenna grid for reflecting at least one of the RF signal or a second RF signal,
wherein at least one of the source power layer and the extender power layer includes:
a capacitor bank used to adjust impedance for forming power spots over the surface;
a low-power microcontroller for controlling configuration of resonators; or
a RF radio chip for sending and receiving messages between a respective source or extender tile and a power source; or
a combination thereof.

12. The RIS of claim 11, wherein the RF radio chip is configured, by thread-based mesh networking, to create a resilient and low-power full-mesh network among the source tile and the extender tiles.

13. The RIS of claim 12, wherein the resilient and low-power full-mesh network is configured to exchange control messages among the source tile and the extender tiles for real-time adjustment of coil impedances and coordination between RIS units.

14. The RIS of claim 13, wherein the RF radio chip uses 6LowPAN and IEEE 802.15.4 for communication at 2.4 GHz frequency band.

15. A reconfigurable intelligent surface (RIS) comprising:
a surface;
a source tile positioned on or proximate a first side of the surface and including:
a source power layer including a power amplifier and a transmitter coil configured to generate an electromagnetic field, and
a radio frequency (RF) layer configured to receive power from the source electromagnetic field, and a patch antenna grid for reflecting a RF signal; and
a plurality of extender tiles positioned on or proximate the first side of the surface, the extender tiles each including:
an extender power layer including a passive transceiver coil for receiving the source electromagnetic field and relaying the source electromagnetic field as an extender electromagnetic field, and
an extender RF layer configured to receive power from the extender electromagnetic field, and an extender patch antenna grid for reflecting at least one of the RF signal or a second RF signal,
wherein:
the patch antenna grid further configured to alter at least one of a phase, an amplitude, or a directionality of the RF signal; and
the extender patch antenna grid further configured to alter at least one of a phase, an amplitude, or a directionality of the at least one of the RF signal or the second RF signal.

16. A reconfigurable intelligent surface (RIS) comprising:
a surface;
a source tile positioned on or proximate a first side of the surface and including:
a source power layer including a power amplifier and a transmitter coil configured to generate an electromagnetic field, and
a radio frequency (RF) layer configured to receive power from the source electromagnetic field, and a patch antenna grid for reflecting a RF signal; and
a plurality of extender tiles positioned on or proximate the first side of the surface, the extender tiles each including:
an extender power layer including a passive transceiver coil for receiving the source electromagnetic field and relaying the source electromagnetic field as an extender electromagnetic field, and
an extender RF layer configured to receive power from the extender electromagnetic field, and an extender patch antenna grid for reflecting at least one of the RF signal or a second RF signal,
wherein the RF signal and/or the second RF signal is a RF data signal.

17. The RIS of claim 16, wherein the RF data signal is a mobile wireless signal.

* * * * *